A. C. GABEL.
PLOW-ATTACHMENT.

No. 175,963. Patented April 11, 1876.

WITNESSES
Robert Everett
George W. Larwer

INVENTOR,
Augustus C. Gabel
Chipman, Hosmer & Co.
by Gilmore, Smith & Co.
ATTORNEYS

UNITED STATES PATENT OFFICE.

AUGUSTUS C. GABEL, OF YORKVILLE, ILLINOIS.

IMPROVEMENT IN PLOW ATTACHMENTS.

Specification forming part of Letters Patent No. 175,963, dated April 11, 1876; application filed March 4, 1876.

*To all whom it may concern:*

Be it known that I, AUGUSTUS C. GABEL, of Yorkville, in the county of Kendall and State of Illinois, have invented a new and valuable Improvement in Attachments to Plows; and I do hereby declare that the following is a full, clear, and exact description of the construction and operation of the same, reference being had to the annexed drawings, making a part of this specification, and to the letters and figures of reference marked thereon.

Figure 1:
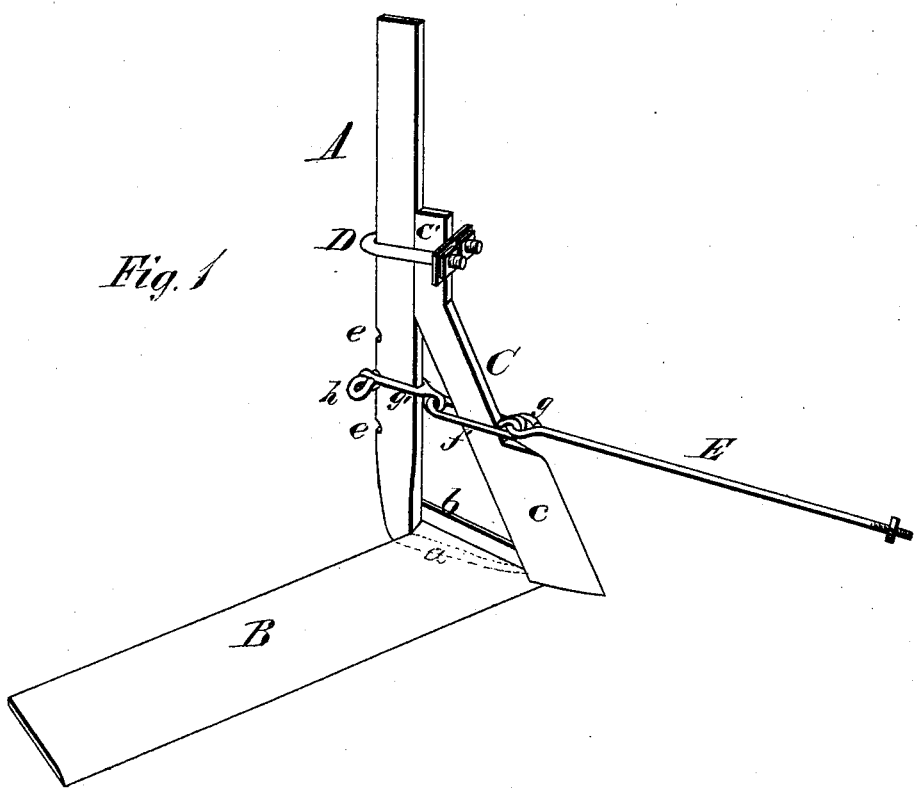
Figure 2:
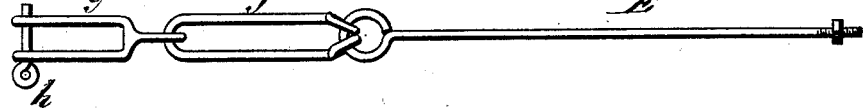

Figure 1 of the drawings is a representation of a perspective view of my plow, and Fig. 2 is a plan view of the eye rod.

This invention has relation to means which are designed to precede a deep-running plow, for the purpose of cutting under and loosening the sod previous to turning it under; and the nature of my invention consists in a flat, horizontally-running share, in combination with a fixed colter, an adjustable draft-bar, and adjustable strengthening-links, as will be hereinafter explained.

In the annexed drawings, A designates a standard, which is designed to be secured in any suitable manner to a plow-beam in front of a deep-running plow. The lower portion of this beam is flattened and tapered, and bent nearly at right angles to the upright portions, so as to form the sole $a$. On this sole-piece $a$ I rigidly but removably secure an oblique share-blade, B, the front cutting-edge of which is diagonal to the line of draft, as shown in Fig. 1. C designates a colter, having a sharp cutting portion, $c$, which is secured to a land-side plate, $b$, which latter is secured to the heel of the standard A. The upper angular extension of the colter-shank, which is lettered $c'$, is secured by a clip, D, to the standard A. E designates a rod, which has an eye, $g$, formed on its rear end. The front end of this rod E is secured to the plow-beam. The eye $g$ has attached to it a link, $f$, which receives through it the colter C, and to which is loosely attached a loop, $g'$, that strides the standard A, and is secured to this standard by a removable pin, $h$, which passes through one of several notches, $e$, made in the back edge of the standard. This attachment of the loop to the standard A allows the standard, colter, and the share to be adjusted and set at any desired pitch.

What I claim as new, and desire to secure by Letters Patent, is—

As an attachment to a plow, the diagonal share B and colter C, secured to a standard, A, in combination with the rod E, its link $f$, loop $g'$, and pin $h$, made adjustable, substantially as described.

In testimony that I claim the above I have hereunto subscribed my name in the presence of two witnesses.

AUGUSTUS C. GABEL.

Witnesses:
R. W. WILLETT,
ANDREW WELCH.